UNITED STATES PATENT OFFICE.

ROBERT WAHL, OF CHICAGO, ILLINOIS.

MANUFACTURE OF FERMENTED MALT BEVERAGES.

1,023,448.  Specification of Letters Patent.  Patented Apr. 16, 1912.

No Drawing.  Application filed August 11, 1911. Serial No. 643,507.

*To all whom it may concern:*

Be it known that I, ROBERT WAHL, a citizen of the United States, residing at Chicago, in the county of Cook and State of Illinois, have invented a new and useful Improvement in the Manufacture of Fermented Malt Beverages, of which the following is a specification.

My invention relates to an improvement in the manufacture of fermented malt beverages generally, including the beverage commonly called beer as well as tonics, ale, stout and the like.

The object of my invention is to provide a novel treatment of those beverages, in their process of manufacture, which shall render them particularly wholesome and palatable with an agreeable taste and a peculiarly agreeable flavor, and increase their stability, both as to the finished pasteurized or unpasteurized product, and also render the pasteurized bottled product chill-proof.

My invention consists in treating, in the manner hereinafter described and claimed, the beverages referred to, in the manufacture thereof, with lactic acid prepared from malt.

For the preferred treatment for accomplishing my purpose the procedure is the following: The required lactic acid may be produced from malt in any suitable manner, but preferably by the process explained in Letters Patent No. 979,810, granted to me December 27, 1910, namely, by mashing malt and acidulating the mash by inoculating it with lactic acid bacteria while maintaining it, until the required extent of acidulation has taken place, at a temperature (46° C. to 55° C., or thereabout) that will promote the fermenting action of those bacteria and prevent practically all other fermentation in the liquid.

In the practice of my present invention, I have obtained the best results by the procedure described in detail as follows: I prepare, in the usual way, a malt mash by mixing crushed malt and water at a suitable temperature favorable to the action of the digestive enzym, peptase, preferably between 30° C. and 40° C. After peptonization has taken place by holding the mash at that temperature for the required period of about an hour, as is customary in preparing a brewers' mash, I proceed to prepare the acidulated mash, hereinafter termed the auxiliary mash, by drawing off the liquor, while the brewers' mash is kept agitated or stirred to permit some of the finely divided starch to pass out with the liquor. This liquor for the auxiliary mash, containing finely divided starch and the extract of malt soluble at the above-named temperature, is heated to 50° C.–55° C. and held under that temperature for from twenty to thirty minutes to destroy any organisms that may be contained therein except the lactic-acid bacteria. The liquor is then cooled to a slightly lower temperature, say to 52° C. or thereabout, and I thereupon inoculate it with a lactic-acid culture of a long-rod type thereby to more effectually check the development of any other microbes, including undesirable species of lactic-acid bacteria, for example those of the short-rod variety, which, if present in considerable numbers, are objectionable because they can not readily be subsequently removed by filtration as thoroughly as the long-rod variety. After inoculation, the liquid is kept at a temperature of between 55° C. and 50° C. for a few hours, and is thereafter maintained for from, say, 24 to 48 hours, at a temperature varying from 52° C. to 40° C., the degree of acidity increasing with the time. In this way the acidity obtained may be as high as 2½ per cent. with a relatively-low percentage of extract, say 8 to 10 per cent., while acidulation produced from finished mash as ordinarily prepared in brewing, and cooled to 55° C.–55° C., as described in my aforesaid patent, requires a strength of liquor of 10 to 20 per cent. of extract. The auxiliary mash thus prepared is added to a malt mash (hereinafter termed the main mash) as usually prepared in the brewery for making lager beer, ale, stout, weiss beer, or any other fermented malt beverage, employing about 5 per cent. of the sour liquor or auxiliary mash to about 95 per cent. of the main mash, whereupon the brewing may be proceeded with according to customary practice, namely of completing the mashing step, drawing off the acidulated wort, boiling it with or without hops and then cooling and carbonating it, or it may be boiled, hopped, cooled, fermented and finished, all in the manner of manufacturing lager beer.

I have found that in thus employing the invention of my aforesaid patent in practical brewing as thus described, the necessary acidity of the auxiliary mash may be obtained much more readily by keeping the temperatures below those at which peptase is destroyed, that is below 55° C.; and that the avoidance of high temperatures before acidulation of the auxiliary mash results in more rapid and higher acidulation thereof, this mash when prepared at temperatures not exceed 55° C. at any time prior to becoming acidulated being better suited to attain the desired acidity than by the usual method of preparing the auxiliary malt mash, wherein the temperature is raised above 60° C., because of the action of the peptase in furnishing by proteolysis the necessary albuminoids in a state readily assimilable for the formation of the protoplasm of the bacteria.

The prepared lactic acid when added to the main mash, as described, retards the action of the diastase on the starch, thereby retaining more dextrin in the beverage (and incidentally reducing the sugar and resultant quantity of alcohol), with the advantages of improving the palatefulness and body of the beverage while the presence of the lactic acid lends zest thereto; and the acid, moreover, exerts a stimulating effect upon the peptase of the malt, enhancing the thoroughness of its digestive action on the albuminoids and so modifying them as to cause coagulable albuminoids to be more effectively thrown out in boiling the wort and the remainder to be agglutinated and precipitated out of the beer by the cold temperatures to which it is subjected in the storing and finishing casks and in the processes of kraeusening, clarifying with isinglass filtration, and other procedures it undergoes in its manufacture. It should be suggested that the lactic-acid culture for the inoculation of each succeeding auxiliary mash may be taken from a previous acidulated auxiliary mash.

Following is a comparative analysis of my filtered acidulated auxiliary mash and in an ordinary filtered brewers' wort taken of the same gravity for the comparison:

|  | Acidulated liquor. | Brewers' wort. |
|---|---|---|
| Balling | 7.54 per cent. | 7.54 per cent. |
| Sugar | 3.86 " " | 5.65 " " |
| Sugar degree | 51.50 " " | 75.00 " " |
| Albumen | 4.51 " " | .375 " " |
| Albumen in extract | 25.05 " " | 5.6 " " |
| Acidity | 2.23 " " | .05 " " |
| Lactic acid | 1.98 " " | .018 " " |
| Phosphoric acid | .05 " " | .02 " " |

The foregoing data show a relatively low percentage of sugar and a relatively high percentage of proteolyzed albumen in the acidulated liquor, besides the high percentage of acid. This filtered sour liquor or auxiliary mash may be boiled without flocculation or coagulation of the albumen, and it may be chilled by icing without producing material haziness or precipitation; while a malt wort prepared in the usual way shows coagulation by heating it and haziness when iced or chilled. The wort, prepared by adding about 5 per cent. of my acidulated mash to ordinary brewers' malt mash, contains a lower percentage of sugar and a higher percentage of proteolyzed albumen than wort produced in the ordinary manner, and when boiled, hopped and cooled it contains less objectionable albuminous matter, so that the finished beverage is practically chill-proof when manufactured in the customary manner involving fermentation of the wort, storage, kraeusening or carbonating, and finishing by filtration. I have furthermore found that the lactic acid of my described preparation itself exerts a proteolytic action on the albuminoids if added to the wort from the main mash or to the beer or other beverage at any stage of its manufacture, though preferably in the mash, and that it therefore so modifies the albuminoids in the beverage as to render it chill-proof, an effect which is materially aided by the process of pasteurizing, inasmuch as the proteolytic action of the lactic acid is materially enhanced by higher temperatures.

While it is preferred, because of the other advantages herein mentioned, to add my acidulated liquor to the main mash, my invention includes the treatment by adding it at any stage in the manufacture subsequent to that of the main fermentation, (preferably in the proportion of about 1 to 2 per cent. of the wort or beer), to obtain the described effects in the beverage of increased zest and chill-proof quality, but, of course, foregoing the described action on the peptase and diastase. It is also worthy of mentioning that the addition of the lactic acid has the following advantage: Most waters used in brewing contain more or less alkali, including carbonate of lime, magnesia, etc., which tends to neutralize the lactic acid developed in the usual mashing procedure and thereby impair the zest of the beverage. By adding more lactic acid according to my improvement, this loss is compensated for and the zest is enhanced.

What I claim as new and desire to secure by Letters Patent is—

1. As an improvement in the art of brewing fermented malt beverages, involving the preparation of a malt-mash, drawing off the wort and boiling the same with hops, cooling and fermenting, the step which consists in adding to the matter under treatment an extract of malt in the form of a liquor acidulated with lactic acid propagated therein.

2. As an improvement in the art of brewing fermented malt beverages, involving the preparation of a malt-mash, drawing off the wort and boiling the same with hops, cooling and fermenting, the step which consists in adding to the mash an extract of malt in the form of a liquor acidulated with lactic acid propagated therein.

3. As an improvement in the art of brewing fermented malt beverages, the step which consists in adding to the mash an extract of malt in the form of a liquor acidulated with lactic acid propagated therein, in the proportions of about 5 per cent. of the acidulated liquor to about 95 per cent. of the mash.

4. In the art of brewing, the process of producing an acidulated auxiliary mash, which consists in mashing the materials in a suitable way but employing therein only temperatures below 55° C., or thereabout, for inverting the starch and albumen, adding to said mash for inoculating the same an extract of malt in the form of a liquor acidulated with lactic acid propagated therein, and maintaining the temperature of the auxiliary mash at 55° C. to 45° C., or thereabout, until the desired degree of acidity is obtained.

ROBERT WAHL.

In presence of—
O. ROEWADE,
JOHN NALIKOWSKY.